US008866938B2

(12) United States Patent
Haas et al.

(10) Patent No.: US 8,866,938 B2
(45) Date of Patent: Oct. 21, 2014

(54) FRAME TO FRAME PERSISTENT SHADOW REDUCTION WITHIN AN IMAGE

(71) Applicant: International Business Machines Corporation, Armonk, NY (US)

(72) Inventors: Norman Haas, Mount Kisco, NY (US); Ying Li, Mohegan Lake, NY (US); Charles A. Otto, Lansing, MI (US); Sharathchandra Pankanti, Darien, CT (US); Hoang Trinh, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 13/786,453

(22) Filed: Mar. 6, 2013

(65) Prior Publication Data

US 2014/0253764 A1    Sep. 11, 2014

(51) Int. Cl.
*H04N 5/235*    (2006.01)
*H04N 5/361*    (2011.01)

(52) U.S. Cl.
CPC ................................. *H04N 5/361* (2013.01)
USPC ....................................... 348/241; 348/222.1

(58) Field of Classification Search
None
See application file for complete search history.

(56) References Cited

U.S. PATENT DOCUMENTS

| 6,678,353 | B2 | 1/2004 | Graumann et al. ........... 378/163 |
| 6,847,728 | B2 | 1/2005 | Tao et al. ...................... 382/106 |
| 7,881,497 | B2 | 2/2011 | Ganguli et al. ............... 382/104 |
| 2005/0201612 | A1 | 9/2005 | Park et al. ..................... 382/154 |
| 2008/0181507 | A1 | 7/2008 | Gope et al. .................... 382/190 |
| 2011/0064273 | A1 | 3/2011 | Zaremski et al. ............. 382/103 |
| 2011/0273620 | A1 | 11/2011 | Berkovich et al. ............ 348/584 |
| 2011/0317875 | A1 | 12/2011 | Conwell ....................... 382/103 |

FOREIGN PATENT DOCUMENTS

GB           2246261 A    1/1992
JP           2007272477 A    10/2007

OTHER PUBLICATIONS

Yoneyama et al. "Moving Cast Shadow Elimination for Robust Vehicle Extraction based on 2D Joint Vehicle/Shadow Models" AVSS 2003.
Sukhtankar et al. "Dynamic Shadow Elimination for Multi-Projector Displays" IEEE CVPR 2001.
Onoguchi et al. "Shadow Elimination Method for Moving Object Detection" 14th ICPR 1998.
Hsieh et al. "A Shadow Elimination Method for Vehicle Analysis" ICPR 2004.

*Primary Examiner* — Roberto Velez
*Assistant Examiner* — Angel L Garces-Rivera
(74) *Attorney, Agent, or Firm* — Ido Tuchman; Anne V. Dougherty

(57) ABSTRACT

An apparatus, computer program product, and method for reducing persistent shadows within an image. The apparatus includes a camera configured to generate frames of the image. The apparatus also includes a computer processor. The computer processor calculates the average normalized brightness for each pixel in the image and adjusts the brightness of each pixel with the average normalized brightness.

10 Claims, 6 Drawing Sheets

FRAME TO FRAME PERSISTENT SHADOW REDUCTION WITHIN AN IMAGE

BACKGROUND

This invention relates to image processing, and more particularly to an apparatus and method for reducing persistent shadows in an image.

When computerized object detection is applied to videos taken by one or more cameras it may happen that the shadow cast by the cameras, the camera support platform, or another persistent shadow source may fall on terrain which is in the field of view of the cameras. These shadows interfere with the object detection process. Conventional shadow removal solutions typically depend on the camera(s) to be at fixed locations (on a street light poles, for instance), and/or require that the shadow fall on a uniform surface, such as road pavement or a projection screen.

BRIEF SUMMARY

Accordingly, one example aspect of the present invention is an apparatus for reducing persistent shadows within an image. The apparatus includes a camera configured to generate frames of the image. The apparatus also includes a computer processor. The computer processor calculates the average normalized brightness for each pixel in the image over at least two frames of the image. The processor adjusts the brightness of each pixel with the average normalized brightness.

Another example of the present invention is a method for reducing persistent shadows within an image. The method includes a calculation step for calculating a normalized brightness for each pixel in the image over at least two frames. An adjusting step adjusts the brightness of each pixel based on the calculated average normalized brightness of each pixel.

Yet another example of the present invention is a computer program product for reducing persistent shadows within an image. The computer program product includes computer readable program code configured to calculate a normalized brightness for each pixel in the image over at least two frames, and adjust a brightness of each pixel based on the calculated normalized brightness of each pixel.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
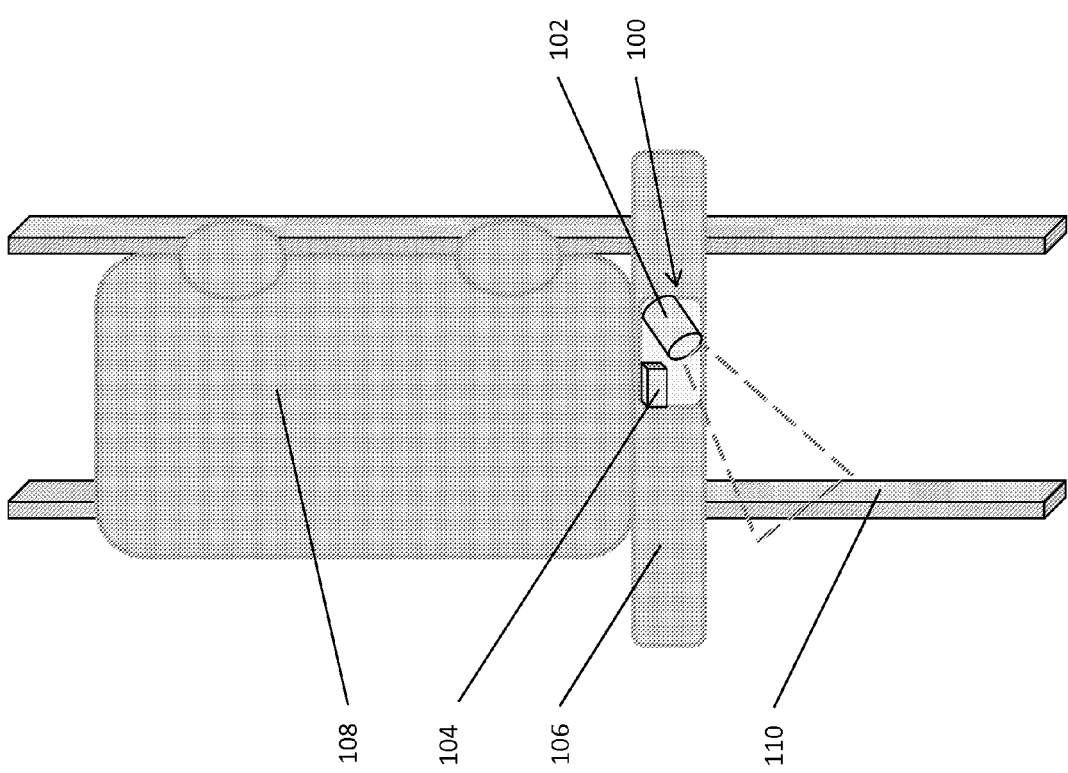
FIG. 1 shows an apparatus for reducing persistent shadows within an image in accordance with one embodiment of the invention.

The present invention is described with reference to embodiments of the invention. Throughout the description of the invention reference is made to FIGS. 1-5. When referring to the figures, like structures and elements shown throughout are indicated with like reference numerals.

FIG. 1 shows an apparatus 100 for reducing persistent shadows within an image in accordance with one embodiment of the invention. The apparatus 100 includes a camera 102 configured to generate at least two frames of the image and a computer processor 104 (e.g., a CPU). The computer processor 104 calculates an average normalized brightness for each pixel in the image and adjusts a brightness of each pixel with the calculated average normalized brightness of each pixel.

In one embodiment, persistent shadows within an image are reduced prior to computerized object detection analytics. In this embodiment, shadows caused by the at least one camera 102 and a camera mounting box 106 are reduced. In one embodiment, the image contains repetitive vertical structures. For example, the image may contain rail 110, anchors, spike heads, tie plates 506 and ballast 504 (see also FIG. 5) when generated in a railroad track application. In other embodiments the image may contain vertical structures associated with roads, pipelines, assembly lines, etc. depending on the application.

In one embodiment, the computer processor 104 is further configured to calculate an average row brightness for each row of pixels in the image. In this embodiment, the computer processor 104 also calculates a normalized brightness for each pixel within each row by dividing the brightness of each pixel by the corresponding average row brightness. Furthermore, in this embodiment the computer processor 104 averages the normalized brightness of each pixel over at least two frames. Finally, in this embodiment the computer processor 104 adjusts the brightness of each pixel with the average normalized brightness of each pixel by dividing the brightness of each pixel by the average normalized brightness of that pixel. In one embodiment, the computer processor 104 calculates the average normalized brightness for each pixel in the image over at most one hundred frames.

In one embodiment, the computer processor 104 is further configured to calculate an overall image adjustment factor by dividing an average overall brightness of a previous frame by the average overall brightness of a current frame. In this embodiment the computer processor 104 also adjusts the brightness of each pixel in the image by multiplying the brightness of each pixel by the overall image adjustment factor.

In one embodiment, the computer processor 104 is further configured to select a reference row from the image and to average the average row brightness of the reference row over at least two frames. In this embodiment, the computer processor 104 also calculates a reference row image adjustment factor by dividing the average row brightness of the reference row over at least two frames by the average row brightness of the reference row in the current frame. Finally, in this embodiment the computer processor 104 adjusts an overall image brightness by multiplying the brightness of each pixel by the reference row image adjustment factor.

In one embodiment, the computer processor 104 is further configured to generate a loss-factor map array. The value of each cell in the loss-factor map array corresponds to the average normalized brightness of a respective pixel in the image.

In one embodiment, the camera 102 is moving with an apparent direction of motion parallel to the image rows. In one embodiment, the apparatus 100 further includes a camera mounting box 106 directly coupled to the camera 102 and mounted to a rail track inspection vehicle 108. In this embodiment the apparent direction of motion is imparted to the camera 102 by moving the rail track inspection vehicle 108 along a railroad track. Furthermore, rail fastener defects are detected before causing misalignments in the railroad track.

Figure 2A:
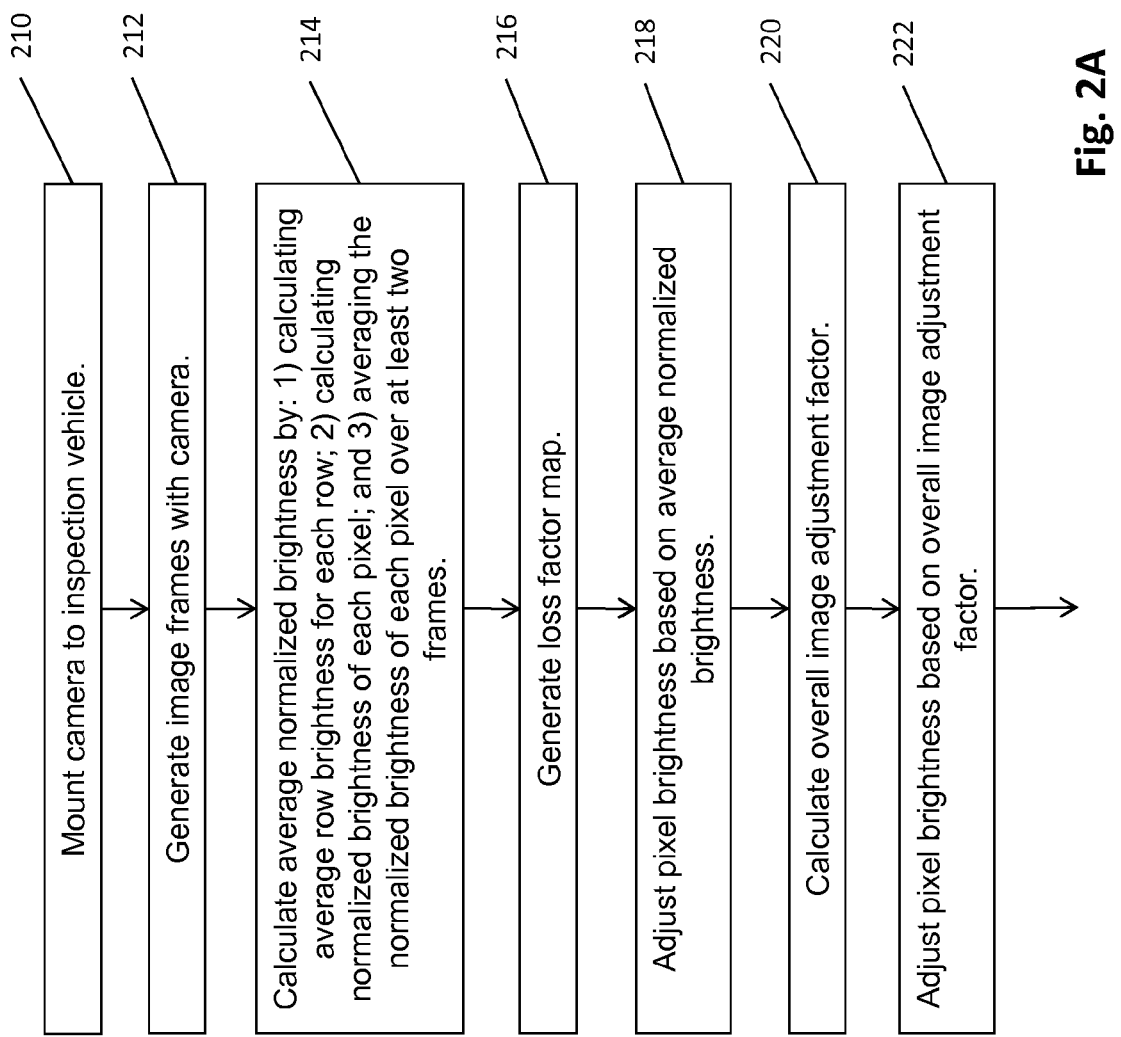
FIGS. 2A and 2B show a method for reducing persistent shadows within an image in accordance with one embodiment of the invention.
Figure 2B:
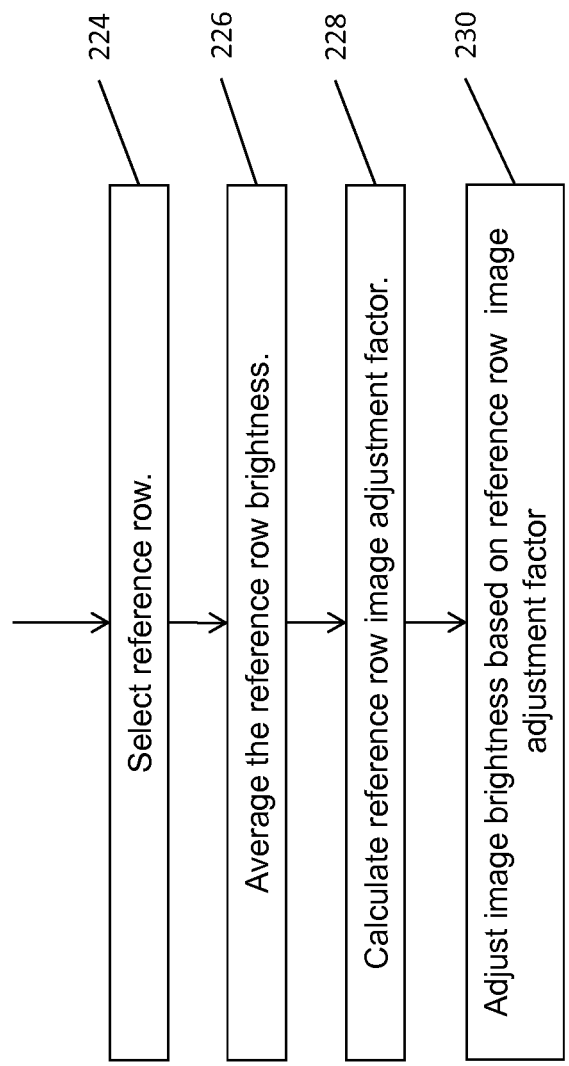

FIGS. 2A and 2B show a method for reducing persistent shadows within an image in accordance with one embodiment of the invention. In this embodiment, the method includes a camera mounting step 210. During the camera mounting step 210 a camera is mounted to a rail track inspection vehicle. After camera mounting step 210 is completed, the method continues to image generating step 212.

At image generating step 212, at least two frames of the image are generated by the camera. The image frames have an apparent direction of motion parallel to that of the image rows. In one embodiment, the apparent direction of motion parallel to that of the image rows is imparted to the camera by moving the rail track inspection vehicle along a railroad track. After image generating step 212 is completed, the method continues to calculating step 214.

At calculating step 214, a normalized brightness for each pixel in the image is calculated over at least two frames. In one embodiment, the average normalized brightness for each pixel is calculated by first calculating an average row brightness for each row of pixels in the image. Next, a normalized brightness for each pixel within each row is calculated by dividing the brightness of each pixel by the corresponding average row brightness. Finally, the average normalized brightness for each pixel is calculated by averaging the normalized brightness of each pixel over at least two frames. In one embodiment, the average normalized brightness for each pixel is calculated over at most one hundred frames. In one embodiment, after calculating step 214 is completed the method continues to loss-factor mapping step 216.

At loss-factor mapping step 216, a loss-factor map array is generated. The value of each cell in the loss-factor map array corresponds to the average normalized brightness of a respective pixel in the image. After loss-factor mapping step 216 is completed, the method continues to pixel brightness adjusting step 218.

At pixel brightness adjusting step 218, the brightness of each pixel in the image is adjusted by dividing the brightness of each pixel by the average normalized brightness of that pixel. After pixel brightness adjusting step 218 is completed, the method continues to calculating step 220.

At calculating step 220, an overall image adjustment factor is calculated by dividing an average overall brightness of a previous frame by the average overall brightness of a current frame. After calculating step 220 is completed, the method continues to adjusting step 222.

At adjusting step 222, the brightness of each pixel in the image is adjusted by multiplying the brightness of each pixel by the overall image adjustment factor. In one embodiment, after overall image brightness step 222 is complete the method continues to reference row selection step 224.

At reference row selecting step 224, a reference row is selected from the image. In one embodiment, the reference row is selected so as to be on the flange of a railroad track rail in every frame. An example of a reference row so positioned is provided in FIG. 5. After reference row selecting step 224 is completed, the method continues to average reference row brightness step 226.

At averaging step 226, the average row brightness of the reference row is calculated over at least two frames. After averaging step 226, the method continues to calculating reference row adjustment step 228.

At calculating reference row adjustment factor step 228, a reference row image adjustment factor is calculated by dividing the average row brightness of the reference row over at least two frames by the average row brightness of the reference row in the current frame. After calculating reference row adjustment step 228, the method continues to adjusting reference row image adjustment step 230.

At adjusting reference row image adjustment step 230 the brightness of each pixel in the image is adjusted by multiplying the brightness of each pixel by the reference row image adjustment factor.

Figure 3:
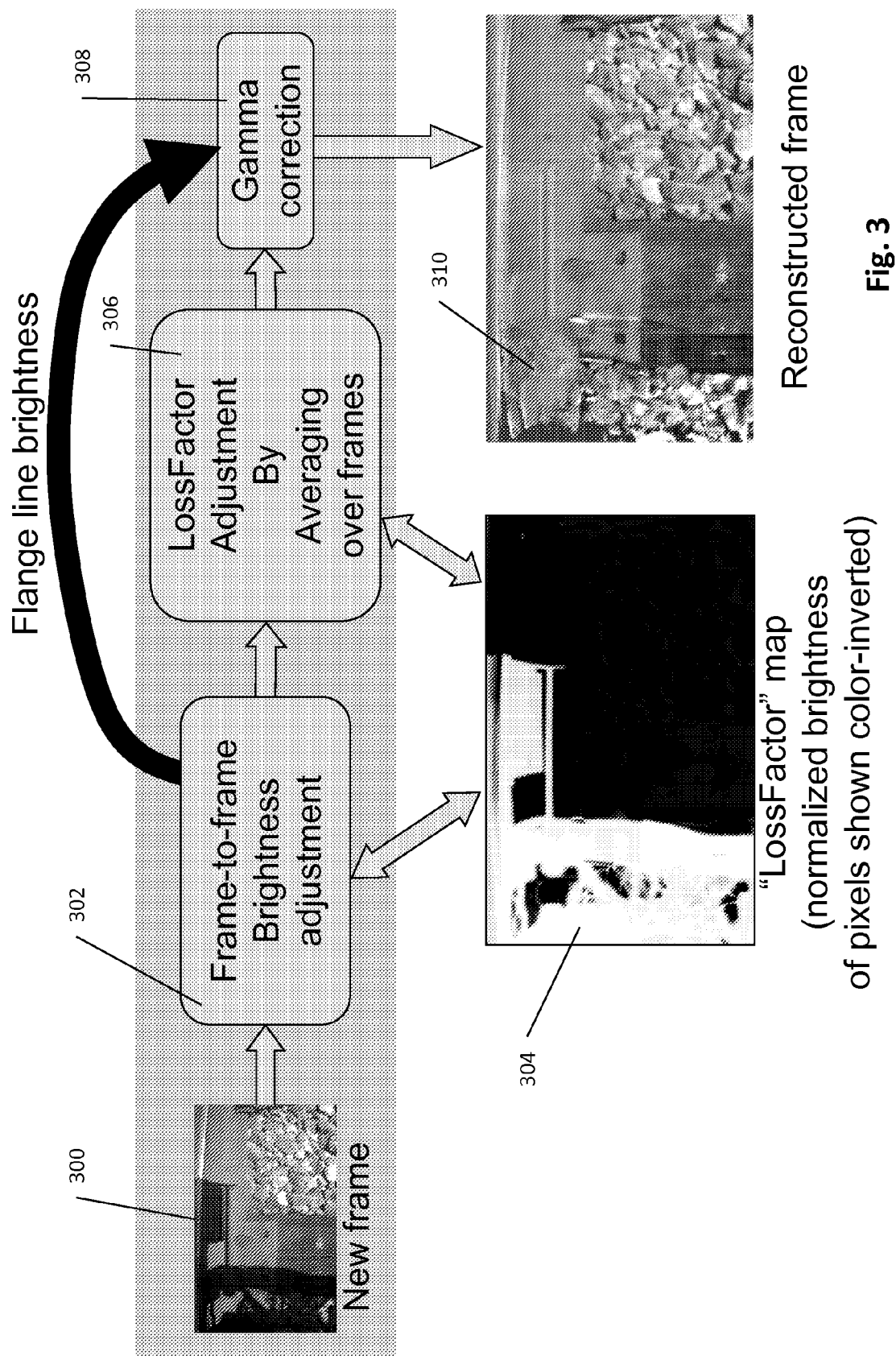
FIG. 3 shows another method for reducing persistent shadows within an image in accordance with one embodiment of the invention.

FIG. 3 shows another method for reducing persistent shadows within an image in accordance with one embodiment of the invention. In this embodiment, the method includes new frame step 300. During new frame step 300 a current frame of the image is selected. After new frame step 300 is completed, the method continues to frame-to-frame brightness adjustment step 302.

At frame-to-frame brightness adjustment step 302, an overall image adjustment factor is calculated by dividing an average overall brightness of a previous frame by the average overall brightness of the current frame. The brightness of each pixel in the current frame is then adjusted by multiplying the brightness of each pixel by the overall image adjustment factor. Furthermore, a reference row is selected from the image. After frame-to-frame brightness adjustment step 302 is completed, the method continues to loss-factor map generation step 304.

At loss-factor map generation step 304, a loss-factor map array is generated. The value of each cell in the loss-factor map array corresponds to the average normalized brightness of a respective pixel in the image. After loss-factor map step 304 is completed, the method continues to loss-factor adjustment step 306.

At loss-factor adjustment step 306, the brightness of each pixel in the image is adjusted by dividing the brightness of each pixel by the average normalized brightness of that pixel, the brightness values being from the corresponding cell of the loss-factor map. After loss-factor adjustment step 306 is completed, the method continues to gamma correction step 308.

At gamma correction step 308, the average row brightness of the reference row selected in frame-to-frame brightness adjustment step 302 is calculated over at least two frames. A reference row image adjustment factor is then calculated by dividing the average row brightness of the reference row over at least two frames by the average row brightness of the reference row in the current frame. Finally, the brightness of each pixel in the image is adjusted by multiplying the brightness of each pixel by the reference row image adjustment factor. After gamma correction step 308 is completed, the method continues to reconstructed frame step 310.

At reconstructed frame step 310, a reconstructed frame with reduced persistent images is provided for downstream processing.

Figure 4:
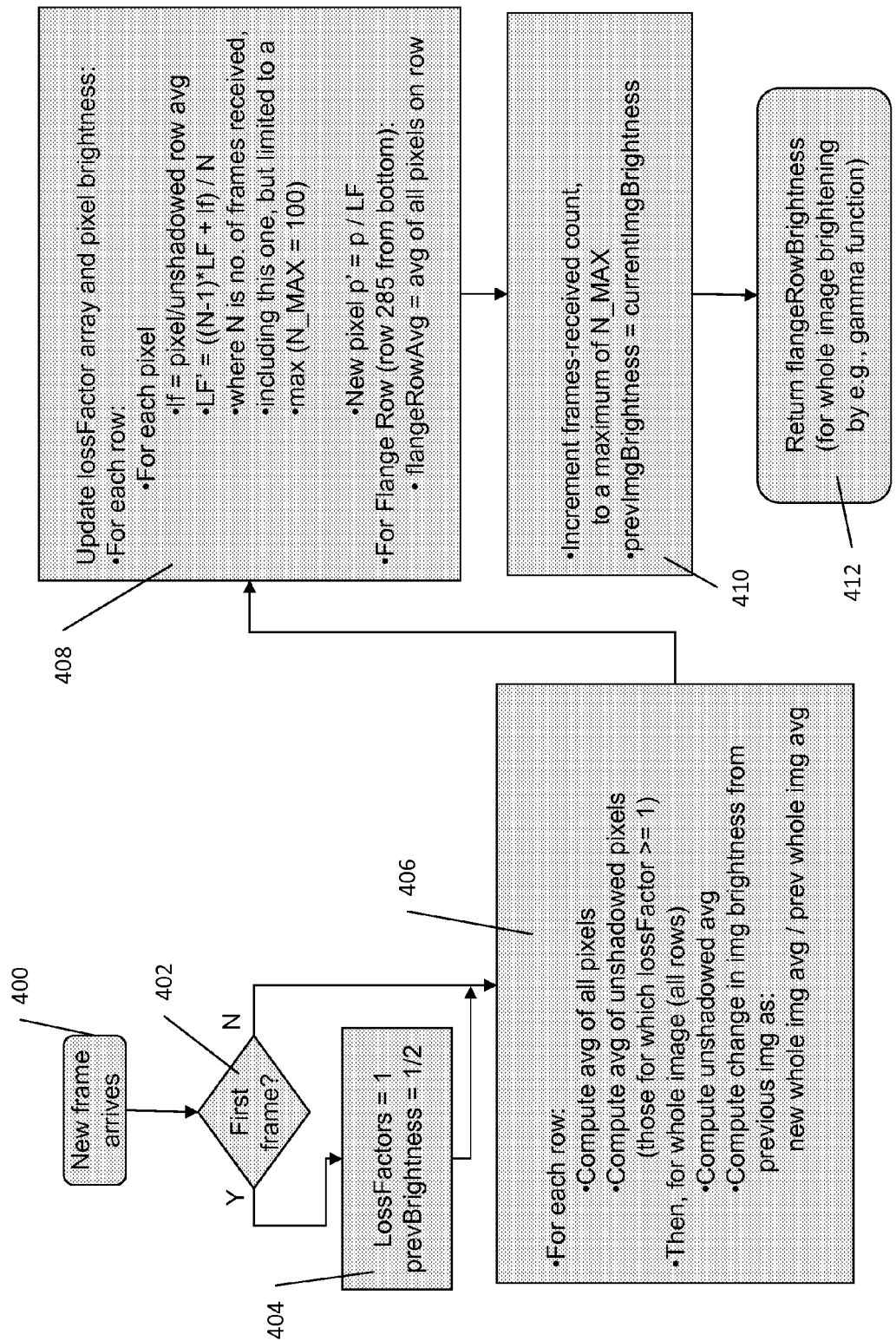
FIG. 4 shows yet another method for reducing persistent shadows within an image in accordance with one embodiment of the invention.

FIG. 4 shows yet another method for reducing persistent shadows within an image in accordance with one embodiment of the invention. In this embodiment, the method includes new frame step 400. During new frame step 400 a current frame of an image is selected. After new frame step 400 is completed, the method continues to first frame check step 402.

At first frame check step 402, the current frame is checked to determine if the current frame is the first frame selected. In this embodiment, if the current frame is the first frame selected the method continues to default values step 404. At default values step 404 a lossFactors array is created and all cells in the array are set to one. In addition, a prevBrightness variable is set to one half. If the current frame is not the first frame the method skips default values step 404 and continues to brightness calculation step 406.

At brightness calculation step 406, an average brightness is calculated for each row of pixels in the current frame of the image. Additionally, an average un-shadowed brightness is calculated for each row of pixels by including only pixels having a lossFactor value greater than or equal to one. Further, an overall image un-shadowed average brightness is calculated. Finally, a change in brightness factor is calculated by dividing the overall image un-shadowed average brightness of the current frame by the overall image un-shadowed average brightness of a previous frame. After brightness calculation step 406, the method continues to lossFactor array step 408.

At lossFactor array step 408, each cell in the lossFactor array is set to an average normalized brightness for each respective pixel over at least two frames. A brightness for each pixel is adjusted by dividing the brightness of each pixel by the average normalized brightness of each respective pixel. Furthermore, the average brightness for a reference row is calculated. In one embodiment the reference row is selected so as to be on the flange 502 (see FIG. 5) of a railroad track rail in every frame. After lossFactor array step 408, the method continues to increment step 410.

At increment step 410, a frame count is incremented by one. In one embodiment the frame count is at most one hundred frames. In addition, the prevBrightness variable is set to the overall image un-shadowed average brightness of the current frame. After increment step 410, the method continues to reference row adjustment step 412.

At reference row brightness step 412, the average brightness of the reference row is provided to downstream processes. In one embodiment, the average brightness of the reference row is provided to a gamma function for whole image brightening.

Figure 5:
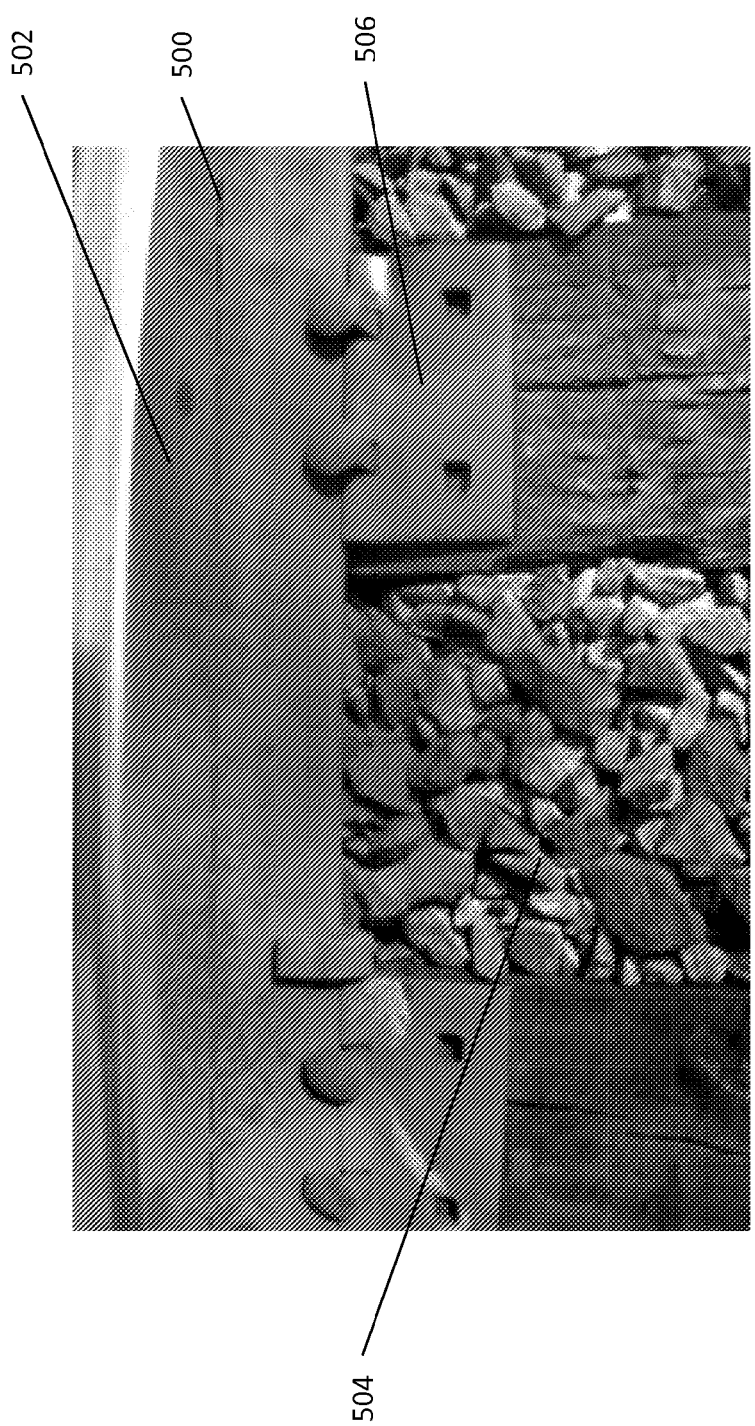
FIG. 5 shows an example of a selected reference row for the reference row image adjustment factor used in one embodiment of the invention.

FIG. 5 shows an example of a selected reference row 500 for the reference row selection step 224 (see FIG. 2) used in one embodiment of the invention. In this embodiment, the reference row 500 is selected so as to be on the flange 502 of a railroad track rail in every frame.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for reducing persistent shadows within an image, the apparatus comprising:
   a camera configured to generate at least two frames of the image; and
   at least one computer processor for calculating an average normalized brightness for each pixel in the image over the at least two frames and adjusting a brightness of each pixel with the average normalized brightness of each pixel;
   wherein the computer processor is further configured to:
   calculate an average row brightness for each row of pixels in the image;
   calculate a normalized brightness for each pixel within each row by dividing the brightness of each pixel by the corresponding average row brightness;
   average the normalized brightness of each pixel over the at least two frames; and
   wherein adjusting the brightness of each pixel with the average normalized brightness of each pixel includes dividing the brightness of each pixel by the average normalized brightness of that pixel.

2. The apparatus of claim 1, wherein the at least one computer processor calculates the average normalized brightness for each pixel in the image over at most 100 frames.

3. The apparatus of claim 1, wherein the computer processor is further configured to:
   calculate an overall image adjustment factor by dividing an average overall brightness of a previous frame by the average overall brightness of a current frame; and
   adjust the brightness of each pixel in the image by multiplying the brightness of each pixel by the overall image adjustment factor.

4. The apparatus of claim 1, wherein the computer processor is further configured to:
   select a reference row from the image;
   average the average row brightness of the reference row over the at least two frames;
   calculate a reference row image adjustment factor by dividing the average row brightness of the reference row over the at least two frames by the average row brightness of the reference row in the current frame; and
   adjust an overall image brightness by multiplying the brightness of each pixel by the reference row image adjustment factor.

5. The apparatus of claim 1, wherein the computer processor is further configured to generate a loss-factor map array, the value of each cell in the loss-factor map array corresponds to the average normalized brightness of a respective pixel in the image.

6. The apparatus of claim 1, wherein the camera has an apparent direction of motion parallel to the image rows.

7. The apparatus of claim 6, further comprising:
   a camera mounting box directly coupled to the camera and mounted to a rail track inspection vehicle; and
   wherein the apparent direction of motion is imparted to the camera by moving the rail track inspection vehicle along a railroad track.

8. A computer program product for reducing persistent shadows within an image, the computer program product comprising:
   a non-transitory computer readable storage medium having computer readable program code embodied therewith, the computer readable program code configured to:
   calculate a normalized brightness for each pixel in the image over at least two frames; and adjust a brightness of each pixel based on the calculated normalized brightness of each pixel;
   wherein the computer readable program code to calculate the average normalized brightness for each pixel includes computer readable program code to:
   calculate an average row brightness for each row of pixels in the image;
   calculate a normalized brightness for each pixel within each row by dividing the brightness of each pixel by the corresponding average row brightness; and
   average the normalized brightness of each pixel over the at least two frames; and
   wherein the computer readable program code to adjust the brightness of each pixel based on the average normalized brightness includes computer readable program code to divide the brightness of each pixel by the average normalized brightness of that pixel.

9. The computer program product of claim 8, wherein the computer readable program code to calculate the average normalized brightness for each pixel is performed over at most i00 frames.

10. The computer program product of claim 8, further comprising computer readable program code to:
- calculate an overall image adjustment factor by dividing an average overall brightness of a previous frame by the average overall brightness of a current frame; and
- adjust the brightness of each pixel in the image by multiplying the brightness of each pixel by the overall image adjustment factor.

\* \* \* \* \*